Jan. 14, 1964

E. R. A. F. BROECKER ETAL 3,117,595

HAND-WHEEL-OPERATED VALVE

Filed June 14, 1961

INVENTORS
Ernst R. A. F. Broecker
Carl-Anker Mejyr
By: Watson, Cole, Grindle & Watson
ATTORNEYS Jan. 14, 1964    E. R. A. F. BROECKER ETAL    3,117,595
HAND-WHEEL-OPERATED VALVE
Filed June 14, 1961    5 Sheets-Sheet 2

INVENTORS
Ernst R. A. F. Broecker
Carl-Anker Mejyr
By: Watson, Cole, Grindle & Watson
ATTORNEYS Jan. 14, 1964   E. R. A. F. BROECKER ETAL   3,117,595
HAND-WHEEL-OPERATED VALVE Filed June 14, 1961   5 Sheets-Sheet 4

INVENTORS
Ernst R. A. F. Broecker
Carl-Anker Meijer
By: Watson, Cole, Grindle & Watson
ATTORNEYS

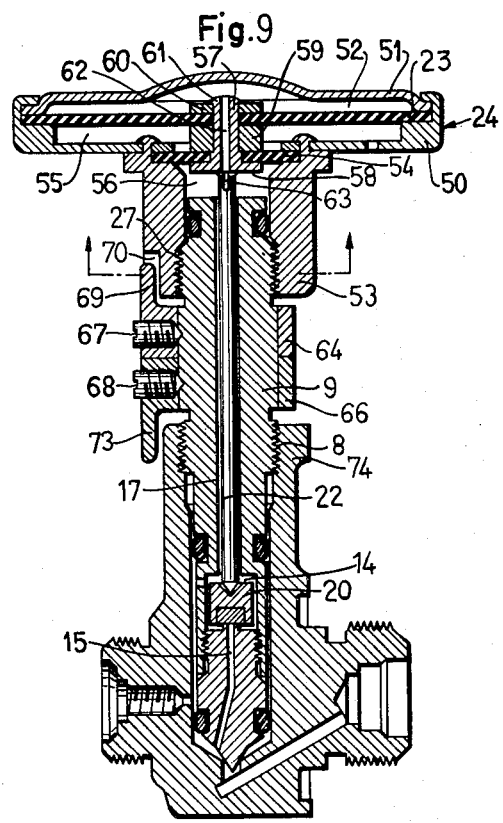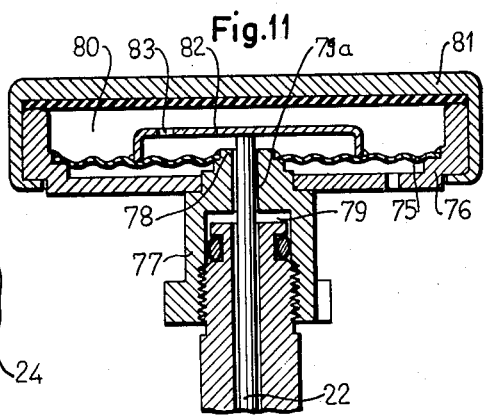

United States Patent Office 3,117,595
Patented Jan. 14, 1964

3,117,595
HAND-WHEEL-OPERATED VALVE
Ernst Reinhold Albert Friedrich Broecker and Carl-Anker Mejyr, Flen, Sweden, assignors to Aktiebolaget Bahco, Stockholm, Sweden, a corporation of Sweden
Filed June 14, 1961, Ser. No. 117,141
Claims priority, application Sweden June 16, 1960
3 Claims. (Cl. 137—637.2)

The present invention relates to a gas valve designed for use with stoves, lamps, refrigerators and the like operated by gas and so arranged that the gas is piped from a container to a burner via a valve. The valve is of the type where a main valve body is connected with a threaded spindle in the valve housing serving to open and close the valve, the connection between the inlet and outlet being via a cavity in the spindle containing an auxiliary valve actuated by a membrane connected with the spindle and operated by the pressure of the gas in such a way that the auxiliary valve moves towards or away from its seat when the gas pressure operating the membrane rises or falls.

Hitherto these auxiliary valves have merely served to ensure that a constant pressure was maintained in the gas emitting from the outlet, this pressure being controlled from the main valve This invention aims at utilizing the auxiliary valve for controlling the pressure of the gas emitting from the outlet. In this way the pressure can be controlled with far greater accuracy than when using the main valve alone.

To achieve this end the invention calls for the membrane controlling the auxiliary valve to be attached to a wheel or knob which is restrictedly rotatable on the spindle so that the auxiliary valve can be moved towards or away from its seat by turning the wheel and membrance in relation to the spindle in the same way as when closing and opening, respectively, the main valve by turning the spindle in relation to the valve housing, the valve being so arranged that the frictional resistance to the rotation of the knob in relation to the spindle is less than the frictional resistance to the rotation of the spindle in relation to the housing.

The auxiliary valve body can be so connected to the membrane that its movement towards the seat, when the membrane is subject to increased pressure, is in the opposite direction to the closing movement of the main valve body and, in the latter case, the wheel is connected to the valve spindle with threads of opposite hand to the threads of the valve spindle in the housing. If, on the other hand, the membrane is so arranged that the movement of the auxiliary valve body towards the seat is in the same direction as the closing movement of the main valve body then the threads are of the same hand.

In the former case, the valve spindle normally has a right-hand thread and the handwheel a left-hand thread, this meaning that the main valve is opened by anti-clockwise rotation of the spindle. For the sake of simplicity it will be assumed that this arrangement is applied in the following case even though the opposite could apply.

The invention is best explained in connection with the attached drawings showing various applications of the invention.

FIGS. 9 and 10 show respectively a longitudinal cross-section and a transverse cross-section along the line X—X of yet another embodiment.

FIG. 11 shows a modification of the embodiment of FIGS. 9 and 10.

Figure 1:
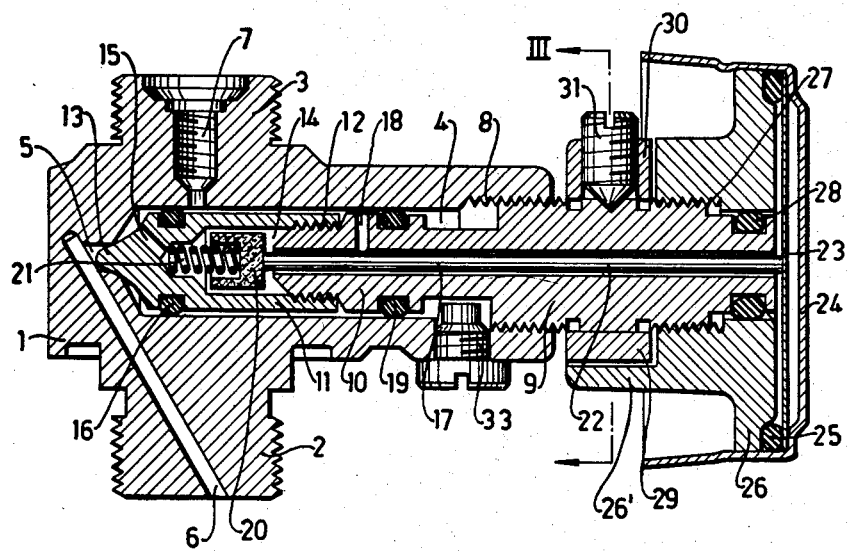
FIG. 1 shows one embodiment of the valve in longitudinal cross-section and in the closed position.

The valve as per FIGS. 1-5 consists of a valve housing 1 with threaded connection members 2, 3 for connection to a gas cylinder and burner respectively. The housing 1 includes a long, mainly cylindrical, chamber 4 which at the inner end is connected via a short axial passage 5 with a gas inlet 6 drilled from connection member 2. A gas outlet 7 is formed in connection member 3, this outlet running from the side of the chamber 4 a short way from the inner end of the chamber.

The outer end of the chamber 4 is threaded at 8 to receive a right-hand threaded spindle 9. This has a section 10, which is of smaller diameter than the chamber, protruding into the chamber 4 and at this point a main valve body 11, which is also of smaller diameter than the chamber, is attached to the chamber via a thread 12. The valve body 11 is provided with a projection 13 fitting with the inner end of the chamber 4 which is in the shape of a valve seat.

The valve body 11 is provided with an inner chamber 14 connected with chamber 4 via a channel 15. At one point between this channel and the mouth of the exit channel 7 there is a sealing ring 16 placed in a groove in the valve housing. By this means the gas is prevented from passing direct from the inlet 6, 5 to the outlet 7 when the valve is open and, instead, the gas has to pass into chamber 14 via channel 15.

From chamber 14 the gas can flow to outlet 7 via a channel 17 running lengthwise in spindle 9 and a connecting channel 18 between the spindle and the chamber 4 and also via the gap between the wall of chamber 4 and the outer surface of the valve body. In order to prevent gas leakage a sealing ring is placed in a groove in spindle 9 outside channel 18.

In the chamber 14 of the valve body 11 there is an auxiliary valve body 20 actuated by a spring 21 which seeks to press the valve against the inner end of spindle 9 around the mouth of channel 17, and also in the opposite direction by means of a rod 22 which passes through channel 17 and is connected with a membrane 23 fastened to a handwheel, and specifically between an outer section 24 and—via sealing ring 25—and inner section 26 of the wheel. The latter is attached to the spindle 9 via threads 27. The sealing between section 26 of the wheel and spindle 9 is achieved by means of sealing ring 28.

The arrangement is that when the valve is open membrane 23, via channel 17, is influenced by the gas pressure so that when the latter increases the auxiliary valve body 20 closes on its seat and restricts the flow of gas. When the gas pressure decreases the auxiliary valve body 20 moves away from the seat so that the opening widens. In this way constant pressure is maintained in the flow of gas through the outlet.

Around spindle 9 there is a ring 29 provided with a protrusion 30 and attached at spindle 9 by means of a locking screw 31 in a hole in this protrusion. The inner section 26 of the wheel is provided with a flange 26' around ring 29, this flange having a recess 32 into which the protrusion 30 fits. The recess 32 is somewhat wider than the protrusion 30 so that the wheel 24, 26 can be turned in relation to spindle 9 between the two positions shown in FIGS. 3 and 4. This turning movement, via membrane 23 and rod 27 results in a movement of the auxiliary valve body 20 relative to its seat formed by the inner end of spindle 9.

The thread 8 between spindle 9 and the valve housing is, as mentioned above, right hand, while the thread 27 between spindle 9 and wheel section 26 is left hand. This means that the opennig of both the main valve and the auxiliary valve is brought about by turning the knob in one direction and that both valves are closed by turning the knob in the opposite direction.

It is also to be noted that the resistance between the movement of the wheel as related to the spindle is only influenced (apart from the resistance of the threads) by the sealing ring 28, whereas the resistance against the movement of the spindle is caused by two sealing rings 16, 19. This means that the first-mentioned resistance is less than the latter. To achieve the same end threads 27 could be provided with slightly more play than threads 8. This means that the turning of knob 24, 26 results first in the turning of the wheel in relation to spindle 9 and, not until this movement is hindered by the engagement between flange 26' and protrusion 30, is spindle 9 turned.

Figure 3:
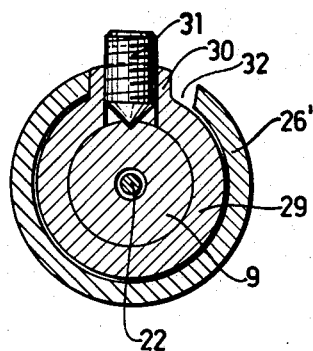
FIGS. 3-5 show cross-sections corresponding to line III—III in FIGS. 1 and 2 with the components in three different positions.
Figure 2:
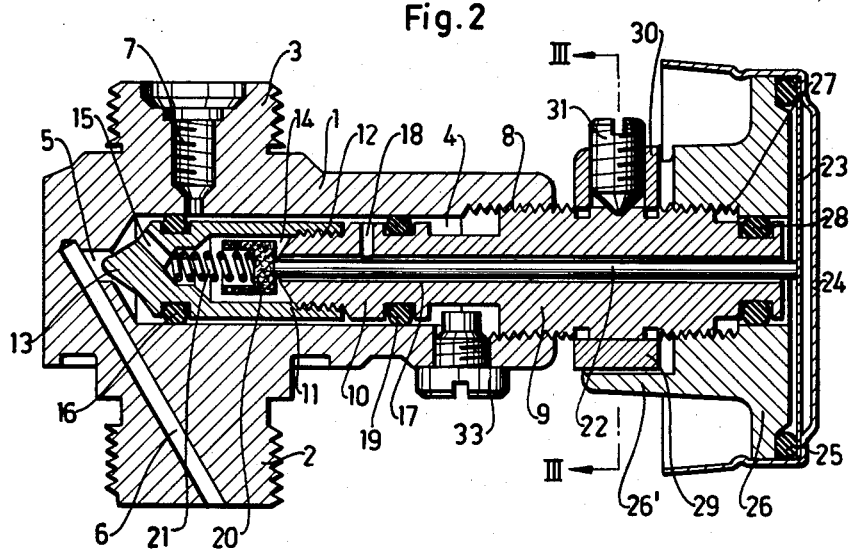
FIG. 2 shows the same valve in longitudinal cross-section and in the open position.
Figure 4:
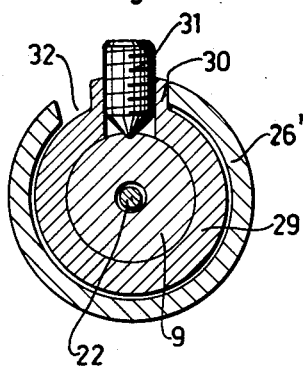
Figure 5:
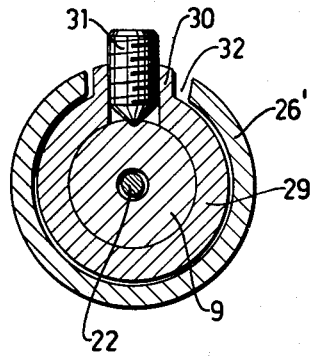

If the main valve 13 is closed, and flange 26' is in a position as shown in FIG. 3 as related to protrusion 30, an anti-clockwise movement of the handwheel to open the valve will imply that the wheel turns on the spindle until the components are in the position shown in FIG. 4 with the opposite side of the recess 32 in flange 26 against the protrusion 30. This will mean that auxiliary valve 20 is moved slightly away from its seat. This is of no consequence, however, as the main valve is still closed. With further movement of the handwheel the valve spindle also turns and the valve is then opened so that the gas can flow out via channels 5, 6, the part of chamber 4 nearest the bottom, channel 15, chamber 14, channels 17, 18, chamber 4 and channel 7. The flange 26' and protrusion 30 are still in the positions shown in FIG. 4 and the position of the auxiliary valve body in relation to its valve seat is still unchanged. FIG. 2 shows the position of the parts when the main valve is fully open and, for the sake of simplicity, it is assumed that this has required one turn of the handwheel.

Turning the wheel clockwise from the position as shown in FIG. 4 means that, to begin with, the wheel is turned in relation to the spindle to the position shown in FIG. 3 and that the supply of gas is checked by the auxiliary valve 29 and without any action on the part of the main valve. For example, the handwheel may be adjusted to the position shown in FIG. 5. When the wheel is turned anti-clockwise from such an intermediate position the first action is that the flow of gas is increased without any action on the part of the main valve. This means that the supply of gas, and consequently the size of the flame, can be regulated by turning the knob between the positions as shown in FIGS. 3 and 4. At the same time the auxiliary valve fills the function of keeping the gas presusre constant at the set value in the manner described above.

A stop in the shape of a screw 33 in the valve housing limits the movement of the valve spindle.

It should be noted that a given positon of the handwheel in relation to the valve housing does not correspond to a given gas pressure and to a given size of flame. Depending upon how far the handwheel is turned to open the main valve one and the same gas pressure can be obtained with the wheel in different positions as related to the valve housing. It is, after all, the position of the handwheel in relation to the spindle which determines the gas pressure and the position of the spindle is of no consequence after the main valve has been opened above a certain minimum position. This means that it is not possible to provide a stationary scale against which the handwheel can be set—an often desirable feature. It is possible, on the other hand, to provide a scale fixed to the valve spindle and set the handwheel against this. The member upon which this scale is attached can then be in the shape of a wheel attached to the spindle. This will mean that the valve spindle can be turned to open and close the main valve by means of that handwheel and that the handwheel movably attached to the valve spindle can be used solely to set the auxiliary valve. An example of this arrangement is shown in FIGS. 6, 7 and 8.

Figure 6:
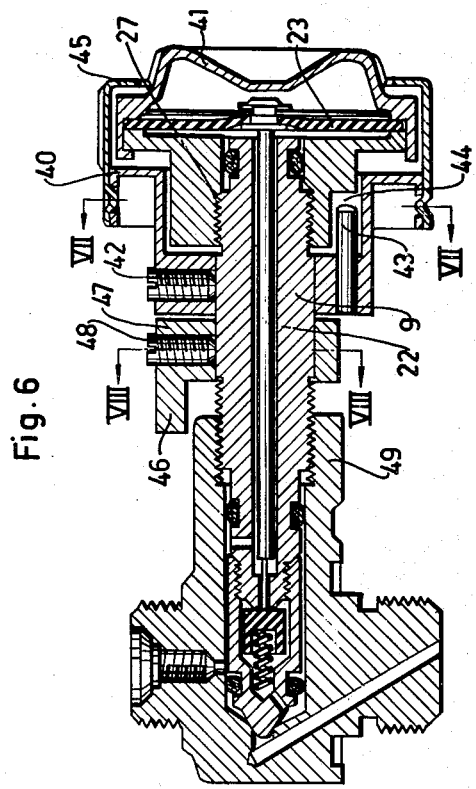
FIG. 6 shows a longitudinal cross-section of another embodiment.
Figure 7:
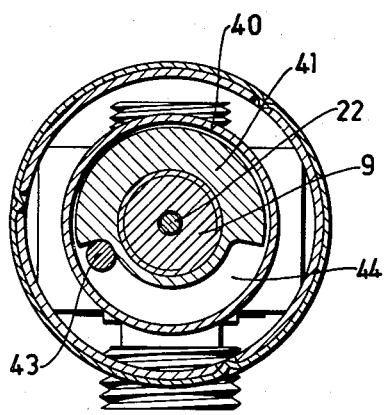
FIGS. 7 and 8 show a section along the lines VII—VII and VIII—VIII in FIG. 6.
Figure 8:
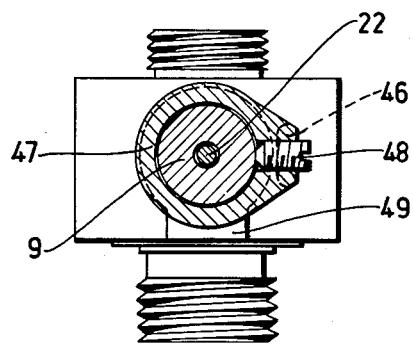

The construction as shown in FIGS. 6–8 is largely the same as that described above as regards the valve housing, main valve, valve spindle and auxiliary valve and consequently only such features as differ from this construction will be described. In the case of components common to both types the designations as used above will be employed.

In this construction an outer handwheel 40 and an inner handwheel 41 are attached to the valve spindle. The first wheel is immovably attached to the spindle 9 by means of a locking screw 42 whereas the second one, to which the rod 22 actuating the membrane 23 is attached, can be rotated on the left-hand thread 27. By the fixed handwheel 40 there is a pin 43 which engages in a notch 44 in the periphery of handwheel 41 and thus serves to limit the rotation of this handwheel in relation to spindle 9. Wheel 40 has a flange 45 surrounding the outer part of the wheel 41 and consequently a scale can be attached with a pointer on an adjacent part of wheel 41.

In this case the limitation of the rotation of the valve spindle is brought about by a stop 46 on ring 47, which is attached to the valve spindle by means of locking screw 48 and by a protrusion 49 on the valve housing engaging with the stop 46. The function of this particular construction should be easy to follow on the basis of the above information and consequently no closer description will be given.

The construction as per FIGS. 9 and 10 is also largely similar to that shown in FIGS. 1–5 and consequently only the components which differ essentially from the above will be described.

In this case the chamber 14 containing the auxiliary valve body 20 is in the inner end of spindle 10. However, the big difference as compared with the construction described above is that the seat of the auxiliary valve is arranged at the mouth of channel 15 instead of at the inner end of channel 17 as in the cases described above. This means that the movement of the auxiliary valve with increased or decreased pressure is the opposite to that described above. As before the auxiliary valve is actuated by rod 22, which passes through channel 17 and is actuated by membrane 23 which is mounted in wheel 24. The wheel consists of an inner shell 50 and an outer disc 51 between which the membrane is attached and which together define a chamber divided by the membrane into two compartments, the outer 52 being connected to the valve chamber 14 in the manner described below. The inner part 50 of the knob is riveted to a hub 53 which at 27 is threaded onto the outer end of spindle 9 and, in this case, the threads 27 are of the same hand as threads 8. Between part 50 and the hub 53 there is a sealing membrane 54 which separates the inner compartment 55 in wheel 24 from a chamber 56 in hub 53 connected with channel 17.

Both membrane 23 and the sealing membrane 54 are fastened at the centre to an attachment 57 pressing against rod 22, said attachment being provided with a flange 58 between which flange and a washer 59 membrane 54 is inserted. Membrane 23 is attached between washer 59 and another washer 60 which is kept in position by the lug 61 on the outer end of attachment 57.

Attachment 57 has a central bore 62 and there is a slot 63 in the outer end of rod 22. Thus when the valve is open the gas can flow from chamber 14 through channel 17, slot 63 and the bore 62 into the space 52 on the outside of membrane 23 so that the gas pressure acts on the latter. At the same time the gas pressure also acts on the inside of membrane 54, that is in the opposite direction, but since this has a smaller area the pressure against membrane 23 dominates. This means that when the valve is open an increase in gas pressure results in auxiliary valve 20 being moved towards its seat so that the flow of gas is throttled. A reduction in gas pressure has the opposite effect.

Around spindle 9 are two rings, 64 and 66, which can be fixed in the required position by stop screws 67 and 68. Ring 64 has a protrusion 69 which engages in a notch 70 in hub 53. As will be seen from FIG. 10 the notch 70 occupies less than a full turn of hub 53 and its ends form stops 71, 72 for protrusion 69. Wheel 24 thus only has a limited amount of movement as related to spindle 9.

Ring 66 has a protrusion 73 designed to engage with protrusion 74 on the valve housing so as to limit the movement of the valve spindle. The function of this particular construction ought to be easy to follow on the basis of the description above and consequently no further details will be given.

The construction as per FIG. 11 only differs from the above as regards the design of the membrane and the wheel. In this case a folded membrane 75 is placed between the inner part 76 of the wheel and the hub 77, the latter having a centre section 78 protruding into the inside of the wheel and to which membrane 75 is attached. The chamber 79 in hub 77 (corresponding to chamber 56 in FIG. 9), via channel 79, puts the extended section 78 in direct connection with space 80 in the wheel which is between the membrane 75 and the outer part 81 of the wheel. Rod 22 passes through channel 79a and its end is against a pressure plate 82 which is peripherally attached to membrane 75. A hole 83 in disc 82 ensures a connection with the parts of space 80 limited by disc 82. The function of this arrangement is obvious and no further description need be given.

We claim:

1. Handwheel-operated gas valve with a valve housing having an inlet and outlet, a chamber connecting said inlet and outlet and containing a seat and a main valve body which is connected with a threaded spindle in the valve housing which can be rotated to move the main valve body towards and away from its seat, the connection between the inlet and outlet of the valve housing passing through a chamber in the valve body containing an auixiliary valve including an auxiliary valve seat and an auxiliary valve body which is actuated by a membrane exposed to the gas pressure in such a way that it is pushed towards said auxiliary valve seat as the gas pressure increases and away from said auxiliary valve seat as the gas pressure decreases, the membrane being attached to a handwheel which can be turned through a limited arc on the valve spindle in such a way that the auxiliary valve body can be moved towards and away from said auxiliary valve seat by turning the handwheel and membrane relative to the spindle in the same direction as when closing and opening, respectively, the main valve body by turning the spindle in relation to the valve housing, the arrangement being such that the frictional resistance to the turning of the handwheel on the spindle is less than the frictional resistance to turning the spindle in the housing.

2. A valve as in claim 1, in which the membrane is so arranged that the movement of the auxiliary valve body towards and away from its seat is opposite to the opening and closing movement respectively, of the main valve body, the handwheel being attached to the spindle on threads of opposite hand to the threads between the spindle and the housing.

3. Valve as in claim 1, in which the valve spindle is also provided with a handwheel rigidly secured thereto.

References Cited in the file of this patent

UNITED STATES PATENTS

| | | |
|---|---|---|
| 1,387,601 | Kimes | Aug. 16, 1921 |
| 2,348,388 | Jenkins | May 9, 1944 |

FOREIGN PATENTS

| | | |
|---|---|---|
| 87,473 | Norway | May 23, 1956 |
| 1,151,322 | France | of 1957 |
| 575,631 | Canada | May 12, 1959 |